April 11, 1939.   G. M. BYRAM   2,154,374
HAZE METER
Filed Nov. 30, 1938

INVENTOR
GEORGE M. BYRAM
BY
ATTORNEYS

Patented Apr. 11, 1939

2,154,374

UNITED STATES PATENT OFFICE 2,154,374

HAZE METER

George M. Byram, Asheville, N. C.; dedicated to the free use of the People in the territory of the United States Application November 30, 1938, Serial No. 243,198

2 Claims. (Cl. 88—23)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the People in the territory of the United States to take effect on the granting of a patent to me.

This invention relates to an instrument designed to determine the atmospheric transmission factor from measurements of haze brightness.

In the prevention of forest fires, the most important of several factors which determine how far forest lookouts can see the small smokes of incipient forest fires is atmospheric clearness.

The maximum distance at which lookouts can discover these small smokes, usually defined as the visibility distance or visual range, varies with changes in atmospheric clearness. This atmospheric clearness or transparency is best defined in terms of the transmission factor, which is the fraction or percentage of light transmitted per unit distance in traveling through the lower atmosphere. Theoretically, the largest value of the transmission factor is unity, or 100 percent, and the smallest value is zero. However, even in the clearest atmosphere, each mile of the lower air absorbs about 3 percent of the light passing through it, so that the maximum value of the transmission factor never exceeds 97 percent in practise and usually varies from 50 to 90 percent.

The instrument hereinafter described is in the nature of a simplified photometer designed to measure the brightness of the haze between an observer and some distant target or some part of the landscape and to express this brightness as a fraction of the horizon brightness in the same direction. This measurement and the distance between the observer and the target determine the transmission factor.

Figure 1:
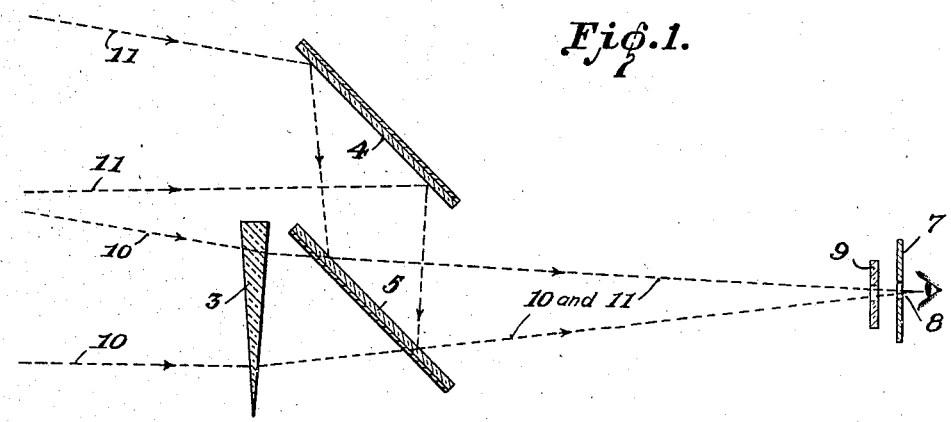
Figure 2:
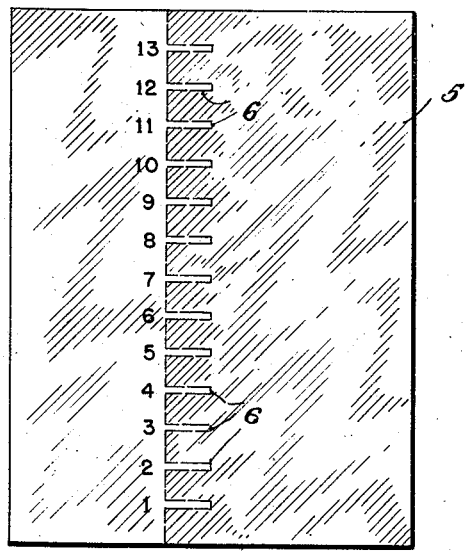

In the accompanying drawing illustrating an embodiment of this invention, Figure 1 is a diagram showing the photometric parts of this invention and their relation to each other, and Figure 2 is a front face view of the mirror designated by the numeral 5.

Referring with more particularity to the drawing in which like numerals designate like parts, the numeral 3 designates an optical wedge ground from smoked glass, or other darkened transparent material, and placed in an inverted position. Two plane silvered mirrors 4 and 5 tilted at an angle of 45°, with their reflecting surfaces facing each other, are disposed directly behind the wedge 3, the mirror 4 being directly above the mirror 5, substantially as shown. The silver from one half of the mirror 5 is removed and a series of non-silvered horizontal slits 6, say thirteen, consecutively numbered, is cut on the silvered portion of the mirror 5. A thin piece 7 of opaque material, such as brass or any other suitable material, having a narrow slit 8 is placed at the observing end of the instrument directly behind a color filter 9, preferably blue. The members 3, 4, 5, 7 and 9 are positioned in a suitable housing (not shown) and mounted by any suitable means (not shown) known to the art. The housing employed should provide for a beam of light 10 to enter the instrument from the horizon through the smoked glass wedge 3 and for a beam of light 11 from a selected landscape target to enter incident to the mirror 4.

The wedge 3 serves to deflect the horizontal beam of light 10 from the horizon slightly upward and at the same time to weaken the intensity of the upper part of this beam of light. The beam then passes through the slits 6, then through the blue filter 9, and finally through the slit 8 into the eye of the observer. Since the upper part of the wedge 3 is much denser than the lower part, the slits 6 will appear to the observer progresively brighter from top to bottom. The beam of light 11 from a selected dark target on the landscape enters the instrument and is reflected from the mirror 4 to the lower mirror 5 where it is again reflected and passes through the blue filter 9 and the slit 8 into the eye of the observer. After the beam 11 is reflected from the mirror 5, both beams 10 and 11 are parallel. This enables the observer to compare the brightness of a distant target with the horizon brightness in that same direction. By directing the instrument so that first one of the slits 6 and then another is contiguous with the reflected image of the target, the observer will notice that some particular slit disappears. This indicates that the target and the particular slit which disappeared are equally brilliant. The brightness of each slit is calibrated for some definite fraction of the horizon brightness. Consequently, the brightness of the target is indicated by the particular slit which disappeared. From this measurement the transmission factor can be determined. In practice it is preferable to have the slits calibrated with the brightness factors ranging from 0.60 at the bottommost slit to 0.14 at the topmost slit.

The blue filter 9 of the instrument facilitates measurements of haze brightness by making all objects seen through the instrument appear in the same color. The purpose of the slit 8 is to make distant objects appear sharply in focus simultaneously with the slits 6 of the lower mirror 5.

It is to be understood that this instrument is not only useful for forest lookouts but for many other purposes. For instance, in meteorology it can be used in measuring fog, smoke, dust density and so forth.

Having thus described my invention, I claim:

1. In an instrument for measuring atmospheric haze brightness, an inverted darkened transparent wedge; a partly silvered mirror declined at an angle of substantially 45° behind said wedge, said mirror having a series of non-silvered slits; another mirror disposed above and substantially parallel to said partly silvered mirror, the reflecting surfaces of said mirrors facing each other; and an eyepiece for observing light which may be reflected from and light which may pass through said partly silvered mirror.

2. In an instrument for measuring atmospheric haze brightness, an inverted smoked glass wedge; a partly silvered mirror declined at an angle of substantially 45° behind said wedge, said mirror having a series of non-silvered slits; another mirror disposed above and substantially parallel to said partly silvered mirror, the reflecting surfaces of said mirrors facing each other; an eyepiece consisting of a piece of opaque material having a slot therein for observing light which may be reflected from and light which may pass through said partly silvered mirror; and a color filter between said eyepiece and said partly silvered mirror.

GEORGE M. BYRAM.